(12) United States Patent
Hellerstein et al.

(10) Patent No.: US 6,330,564 B1
(45) Date of Patent: Dec. 11, 2001

(54) SYSTEM AND METHOD FOR AUTOMATED PROBLEM ISOLATION IN SYSTEMS WITH MEASUREMENTS STRUCTURED AS A MULTIDIMENSIONAL DATABASE

(75) Inventors: Joseph L. Hellerstein; Po Chang Yue, both of Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,239

(22) Filed: Feb. 10, 1999

(51) Int. Cl.[7] ............................... G06F 17/00; G06F 7/00
(52) U.S. Cl. .............................................................. 707/101
(58) Field of Search ............................. 707/5, 100, 101, 707/103, 104

(56) References Cited

U.S. PATENT DOCUMENTS

| | | | |
|---|---|---|---|
| 5,488,725 | * | 1/1996 | Turtle ................................. 395/600 |
| 5,918,232 | * | 6/1999 | Pouschine et al. .................. 707/103 |
| 5,924,090 | * | 7/1999 | Krellenstein ............................ 707/5 |
| 5,940,818 | * | 8/1999 | Malloy et al. ............................ 707/2 |
| 5,943,668 | * | 8/1999 | Malloy et al. ............................ 707/3 |
| 5,963,936 | * | 10/1999 | Cochrane ................................. 707/3 |
| 6,018,736 | * | 1/2000 | Gilai et al. .............................. 707/6 |
| 6,041,326 | * | 3/2000 | Amro et al. .......................... 707/10 |
| 6,094,651 | * | 7/2000 | Agrawal ................................. 707/5 |
| 6,108,647 | * | 8/2000 | Poosala ................................... 707/1 |
| 6,134,541 | * | 10/2000 | Castelli et al. .......................... 707/2 |

* cited by examiner

Primary Examiner—John Breene
Assistant Examiner—Linh M Pham
(74) Attorney, Agent, or Firm—Wayne L. Ellenbogen; Anne Vachon Dougherty

(57) ABSTRACT

A system and method are described for automating navigations in systems with measurement data that are structured as a multidimensional database (MDDB). The navigation includes an Automated Navigation Engine that uses external representations of a dimension selection function and a cube selection function to guide MDDB navigations. The method consists of the steps: (1) select the MDDB dimension that has the largest dimension selection score; (2) if this score is too small, terminate the method; (3) otherwise, select the cube with the largest cube selection score. These steps are performed repeatedly until (2) applies. Navigations can be performed for data mining, problem isolation, trending analysis, etc.

25 Claims, 20 Drawing Sheets

FIG.2

| Shift | Hour | Minute | Subnet | Host | Division | Department | User | Transaction | ResponseTime |
|---|---|---|---|---|---|---|---|---|---|
| 1 | 8 | 10 | 9.2.15 | x1 | 25 | MVXD | ABC | _XX | 10.96 |
| 1 | 8 | 10 | 9.2.15 | x1 | 25 | MVXD | ABC | _XXB | 16.52 |
| 1 | 8 | 10 | 9.2.14 | x10 | 33 | MVXD | ABC | _XA | 8.36 |
| 1 | 8 | 10 | 9.2.16 | x3 | 22 | MVXD | ABC | _XD | 4.33 |
| 2 | 5 | 10 | 9.2.15 | x2 | 22 | MVXD | ABC | _XX | 12.77 |
| 2 | 6 | 3 | 9.2.17 | x115 | 25 | MVXD | ABC | _XA | 0.81 |
| 3 | 12 | 10 | 9.2.15 | x2 | 33 | MVXD | ABC | _XD | 19.84 |
| 3 | 1 | 1 | 9.2.17 | x114 | 27 | MVXD | ABC | _XX | 4.29 |
| 3 | 2 | 10 | 9.2.16 | x4 | 22 | MVXD | ABC | _XX | 6.3 |

| Shift | Hour | Minute | Subnet | Host | Div. | Dept. | User | Tran. | RESP. | Avg. |
|---|---|---|---|---|---|---|---|---|---|---|
| 1 | 8 | 10 | 9.2.15 | x1 | 25 | MVXD | ABC | _XX | 10.96 | |
| 1 | 8 | 10 | 9.2.15 | x1 | 25 | MVXD | ABC | _XXB | 16.52 | |
| 1 | 8 | 10 | 9.2.14 | x10 | 33 | MVXD | ABC | _XA | 8.36 | |
| 1 | 8 | 10 | 9.2.16 | x3 | 22 | MVXD | ABC | _XD | 4.33 | |
| 2 | 5 | 10 | 9.2.15 | x2 | 22 | MVXD | ABC | _XX | 12.77 | |
| 2 | 6 | 3 | 9.2.17 | x115 | 25 | MVXD | ABC | _XA | 0.81 | |
| 3 | 12 | 10 | 9.2.15 | x2 | 33 | MVXD | ABC | _XD | 19.84 | |
| 3 | 1 | 1 | 9.2.17 | x114 | 27 | MVXD | ABC | _XX | 4.29 | |
| 3 | 2 | 10 | 9.2.16 | x4 | 22 | MVXD | ABC | _XX | 6.3 | 9.35 |

TIME (300), Configuration Element (305), Workload (310), Metric (315)

MDDB Tuples (400)

(...,RT) (410)

RT = Response Time

Drill-down on Time (500)

MDDB Tuples (400)

| Shift | Hour | Minute | Subnet | Host | Div. | Dept. | User | Tran. | RESP. | Avg. |
|---|---|---|---|---|---|---|---|---|---|---|
| 1 | 8 | 10 | 9.2.15 | x1 | 25 | MVXD | ABC | _XX | 10.96 | |
| 1 | 8 | 10 | 9.2.15 | x1 | 25 | MVXD | ABC | _XXB | 16.52 | |
| 1 | 8 | 10 | 9.2.14 | x10 | 33 | MVXD | ABC | _XA | 8.36 | |
| 1 | 8 | 10 | 9.2.16 | x3 | 22 | MVXD | ABC | _XD | 4.33 | 10.04 |
| 2 | 5 | 10 | 9.2.15 | x2 | 22 | MVXD | ABC | _XX | 12.77 | |
| 2 | 6 | 3 | 9.2.17 | x115 | 25 | MVXD | ABC | _XA | 0.81 | 6.79 |
| 3 | 12 | 10 | 9.2.15 | x2 | 33 | MVXD | ABC | _XD | 19.84 | |
| 3 | 1 | 1 | 9.2.17 | x114 | 27 | MVXD | ABC | _XX | 4.29 | |
| 3 | 2 | 10 | 9.2.16 | x4 | 22 | MVXD | ABC | _XX | 6.3 | 10.14 |

(Shift=1,,,RT)
(Shift=2,,,RT)
(Shift=3,,,RT)

FIG.5B

Drill-down on Configuration Element (510)

| Shift | Hour | Minute | Subnet | Host | Div. | Dept. | User | Tran. | RESP. | Avg. |
|---|---|---|---|---|---|---|---|---|---|---|
| 2 | 6 | 3 | 9.2.17 | x115 | 25 | MVXD | ABC | _XA | 0.81 | |
| 3 | 1 | 1 | 9.2.17 | x114 | 27 | MVXD | ABC | _XX | 4.29 | 2.55 |
| 1 | 8 | 10 | 9.2.16 | x3 | 22 | MVXD | ABC | _XD | 4.33 | |
| 3 | 2 | 10 | 9.2.16 | x4 | 22 | MVXD | ABC | _XX | 6.3 | 5.31 |
| 1 | 8 | 10 | 9.2.15 | x1 | 25 | MVXD | ABC | _XX | 10.96 | |
| 1 | 8 | 10 | 9.2.15 | x1 | 25 | MVXD | ABC | _XXB | 16.52 | |
| 2 | 5 | 10 | 9.2.15 | x2 | 22 | MVXD | ABC | _XX | 12.77 | |
| 3 | 12 | 10 | 9.2.15 | x2 | 33 | MVXD | ABC | _XD | 19.84 | 15.02 |
| 1 | 8 | 10 | 9.2.14 | x10 | 33 | MVXD | ABC | _XA | 8.36 | 8.36 |

MDDB Tuples (400)

(,Subnet=9.2.17,,RT)

(,Subnet=9.2.16,,RT)

(,Subnet=9.2.15,,RT)
(,Subnet=9.2.14,,RT)

FIG.5C

Drill-down on Workload (520)

| Shift | Hour | Minute | Subnet | Host | Div. | Dept. | User | Tran. | RESP. | Avg. |
|---|---|---|---|---|---|---|---|---|---|---|
| 1 | 8 | 10 | 9.2.16 | x3 | 22 | MVXD | ABC | _XD | 4.33 | |
| 3 | 2 | 10 | 9.2.16 | x4 | 22 | MVXD | ABC | _XX | 6.3 | |
| 2 | 5 | 10 | 9.2.15 | x2 | 22 | MVXD | ABC | _XX | 12.77 | 7.8 |
| 2 | 6 | 3 | 9.2.17 | x115 | 25 | MVXD | ABC | _XA | 0.81 | |
| 1 | 8 | 10 | 9.2.15 | x1 | 25 | MVXD | ABC | _XXB | 16.52 | |
| 1 | 8 | 10 | 9.2.15 | x1 | 25 | MVXD | ABC | _XX | 10.96 | 9.43 |
| 1 | 1 | 1 | 9.2.17 | x114 | 27 | MVXD | ABC | _XX | 4.29 | 8.36 |
| 3 | 12 | 10 | 9.2.15 | x2 | 33 | MVXD | ABC | _XD | 19.84 | |
| 1 | 8 | 10 | 9.2.14 | x10 | 33 | MVXD | ABC | _XA | 8.36 | 14.1 |

MDDB Tuples (400)

(,,Division=22,RT)
(,,Division=25,RT)
(,,Division=27,RT)
(,,Division=33,RT)

FIG.6A

Drill-down on Time after drill-down on Configuration Element (600)

| Shift | Hour | Minute | Subnet | Host | Div. | Dept. | User | Tran. | RESP. | Avg. |
|---|---|---|---|---|---|---|---|---|---|---|
| 1 | | | 9.2.15 | x1 | 25 | MVXD | ABC | _XXB | 16.52 | |
| 1 | 8 | 10 | 9.2.15 | x1 | 25 | MVXD | ABC | _XX | 10.96 | 13.74 |
| 2 | 5 | 10 | 9.2.15 | x2 | 22 | MVXD | ABC | _XX | 12.77 | 12.77 |
| 3 | 12 | 10 | 9.2.15 | x2 | 33 | MVXD | ABC | _XD | 19.84 | 19.84 |

MDDB Tuples (400)

(Shift=1, Subnet=9.2.15,,RT)
(Shift=2, Subnet=9.2.15,,RT)
(Shift=3, Subnet=9.2.15,,RT)

FIG.6B

Drill-down on Configuration Element after drill-down on Configuration Element (610)

| Shift | Hour | Minute | Subnet | Host | Div. | Dept. | User | Tran. | RESP. | Avg. |
|---|---|---|---|---|---|---|---|---|---|---|
| 1 | | | 9.2.15 | x1 | 25 | MVXD | ABC | _XXB | 16.52 | |
| 1 | 8 | 10 | 9.2.15 | x1 | 25 | MVXD | ABC | _XX | 10.96 | 13.74 |
| 2 | 5 | 10 | 9.2.15 | x2 | 22 | MVXD | ABC | _XX | 12.77 | |
| 3 | 12 | 10 | 9.2.15 | x2 | 33 | MVXD | ABC | _XD | 19.84 | 16.305 |

MDDB Tuples (400)

(,Subnet=9.2.15 Host=x1,,RT)
(,Subnet=9.2.15 Host=x2,,RT)

FIG.6C

Drill-down on Workload after drill-down on Configuration Element (620)

| Shift | Hour | Minute | Subnet | Host | Div. | Dept. | User | Tran. | RESP. | Avg. |
|---|---|---|---|---|---|---|---|---|---|---|
| 2 | 5 | 10 | 9.2.15 | x2 | 22 | MVXD | ABC | _XX | 12.77 | 12.77 |
| 1 | 8 | 10 | 9.2.15 | x1 | 25 | MVXD | ABC | _XXB | 16.52 | |
| 1 | 8 | 10 | 9.2.15 | x1 | 25 | MVXD | ABC | _XX | 10.96 | 13.74 |
| 3 | 12 | 10 | 9.2.15 | x2 | 33 | MVXD | ABC | _XD | 19.84 | 19.84 |

MDDB Tuples (400)

(.,Subnet=9.2.15, Division=22,RT)
(.,Subnet=9.2.15, Division=25,RT)
(.,Subnet=9.2.15, Division=33,RT)

FIG.8

| Class | Method | Argument Object | Return Objects |
|---|---|---|---|
| CategoryDimension | Constructor | Vector of Category Attributes | CategoryDimension |
| MetricDimension | Constructor | Tree of Metric Attributes | MetricDimension |
| MDDBSchema | Constructor | Vector of Dimensions | MDDBSchema |
| Cube | Constructor | MDDBSchema | Cube |
| | drillDown | Dimension | Set of Cubes |
| | rollUp | Dimension | Cube |
| | getFirstDimension | | Dimension |
| | getNextDimension | | Dimension |
| | value | | Float |

FIG. 10

| Class | Method | Argument Object | Return Objects |
|---|---|---|---|
| AutoNavigate | Constructor | File | AutoNavigate |
| | dimensionScore | Cube, Dimension | Float |
| | cubeScore | Cube | Float |
| | navigate | Cube, Float | Cube |
| | selectDimension | Cube | Float, Dimension |
| | selectCube | Cube, Dimension | Cube |
| CubeSet | Constructor | Set of Cubes | CubeSet |
| | value | | Set of Float |
| | getFirstCube | | Cube |
| | getNextCube | | Cube |

SYSTEM AND METHOD FOR AUTOMATED PROBLEM ISOLATION IN SYSTEMS WITH MEASUREMENTS STRUCTURED AS A MULTIDIMENSIONAL DATABASE

FIELD OF THE INVENTION

The present invention relates generally to automating data analysis tasks and more specifically to diagnosing performance and availability problems in information systems using data structured as a multidimensional database.

BACKGROUND OF THE INVENTION

A critical element of computer operations and data management is managing performance problems, such as resolving long response times in client-server systems and low throughputs for nightly database updates. Such considerations require mechanisms for detecting, diagnosing, and resolving performance problems. The present invention addresses diagnosis of computer performance problems.

Often, diagnosis proceeds in two phases. The first is problem isolation in which the problem is localized, such as to a component (e.g., router), user, and/or time. The second phase is root-cause analysis in which the underlying cause of the problem is determined, such as identifying a business application that uses high-overhead operating system services.

Ideally, both phases of diagnosis are automated. Unfortunately, it is difficult in practice to automate root-cause analysis in that such analysis requires a detailed knowledge of the system being analyzed. The requisite knowledge is often difficult to acquire, represent, and maintain.

In contrast, problem isolation can be approached in a more general way. Consider a computer installation in which users are experiencing long response times. A commonly used approach to problem isolation is to structure measurements based on abstraction hierarchies. Each hierarchy consists of multiple levels, and within levels there are abstraction instances. Problem isolation consists of repeatedly: (a) selecting levels within abstraction hierarchies that best characterize the problem and then (b) focusing on those abstraction instances that most evidence the problem within the levels selected.

To illustrate the concept of abstraction hierarchies and to demonstrate problem isolation based on abstraction hierarchies, a running example is introduced. The example considers response time problems for which there are three abstraction hierarchies: time, configuration element, and workload. Within the time hierarchy, there are levels for shift, hour, and minute. Within shift, the abstraction instances are 1, 2, and 3. Within hour are abstraction instances of hours for a shift. For example, shift 1 has the hours 8, 9, 10, 11, 12, 1, 2, 3, and 4. Within minute are the minute values within an hour for a shift. Similarly, the configuration element hierarchy has the levels subnet and host; the workload hierarchy has levels division, department, user, and transaction.

To demonstrate problem isolation using abstraction hierarchies, the following scenario is considered for the running example, with reference to FIG. 2:

Step 1: The analyst computes average response times for the highest level in each abstraction hierarchy. That is, the analyst computes average response times for each: (a) shift (for the time hierarchy), (b) subnet (for the configuration element hierarchy), and (c) division (for the user hierarchy).

Step 2: The analyst makes a judgment as to which abstraction hierarchy best isolates the performance problem. In the running example, the analyst selects the hierarchy with the largest range of response time values, which is the configuration element hierarchy.

Step 3: The analyst makes a judgment as to which instances in the abstraction hierarchy selected in Step 2 best localize the problem. In the running example, the analyst selects the instance with the largest value, which is 9.2.15.

Step 4. The analyst repeats the foregoing until problem isolation has been completed.

In support of the foregoing scenario, measurement data are often placed into a relational database, which allows analysts to use general purpose reporting and analysis tools. A relational database structures data into tables. The columns or attributes of a table specify information that is present in each row of the table. In the running example, a single table with a column for each level in an abstraction hierarchy is provided, specifically: shift, hour, minute, subnet, host, division, department, user, and transaction.

Although the relational model offers advantages in analysis, it does not directly support abstraction hierarchies. This drawback motivates the structuring of data into a multidimensional database (MDDB), sometimes referred to as On-line Analysis Processing (OLAP). An MDDB provides support for abstraction hierarchies and for navigations between levels in abstraction hierarchies. MDDBs have been implemented in many ways (e.g., R. Agrawal, A. Gupta, and Sunit Sarawagi, "Modeling Multidimentional Databases," International Conference on Data Engineering, 1997, pp. 232–242; R. Kimbell, The Data Warehouse Toolkit, John Wiley and Sons, 1996; and SAS, "SAS/EIS" Software, http://www.sas.com/software/components/eis.html, 1998).

For expository convenience, an MDDB is viewed as a layer on top of a relational database (as in SAS, 1998). An MDDB cube (or slice) specifies a subset of the data within a relational table. Subcubes are structured so as to facilitate the aggregations needed to support abstraction hierarchies. Specifically, a subset of the attributes of the underlying relational table are partitioned into dimensions. Dimensions correspond to the abstraction hierarchies. Attributes within a dimension are arranged hierarchically, which corresponds to levels in the abstraction hierarchies.

Distinction is made between two kinds of dimensions. The first are category dimensions. A category dimension consists of category attributes that qualify the nature of what is measured (e.g., system, time, user). Category attributes are typically strings, time values, or integers. Second, there are metric dimensions. A metric dimension is composed of metric attributes that provide measures of interest (e.g., response times, waits, throughputs). An MDDB schema has one metric dimension and zero or more category dimensions. In the running example, the category dimensions are configuration element, time, and workload. The metric dimension consists only of response time, although there could be other attributes as well, such as wait times and service times (which are components of response times).

A cube is described by an MDDB tuple, which consists of a coordinate vector for each dimension in an MDDB schema. For the metric dimension, the coordinate vector only specifies the level considered (e.g., wait times). For a category dimension, the coordinate vector specifies the abstraction instances used for levels in the dimension hierarchy. For example, a coordinate vector for the time dimension in the running example is: shift=1, hour=8. Note that:

(a) not all levels need have an abstraction instance specified, and (b) an abstraction instance is specified at level N in the hierarchy only if an abstraction instance is also specified at level N−1. An MDDB tuple contains all the coordinate vectors for each dimension.

The value of a cube is obtained by querying the underlying relational data and computing an aggregate value of the metric attribute (e.g., average response time). The rows obtained in the query are determined by the category coordinates, and the aggregation function and values used are determined by the metric coordinate. Details on how to construct such a query are contained in the aforementioned Kimbell reference.

"Drill-down" is an operation performed on a cube for one or more dimensions in the MDDB schema of that cube. Drill-down produces new cubes that have: (a) the same coordinates as the original cube for the non-drill-down dimensions and (b) a longer coordinate vector in the drill-down dimension due to the fact that an abstraction instance is specified for the next lower attribute in the drill-down dimension.

Drill-down is illustrated using the running example. Consider the cube with the coordinate vectors:

configuration element: subnet=9.2.15 time: shift=1, hour=8 user: division=22, department=MVXD, user=ABC

A drill-down in the time dimension results in a set of cubes, each of which has the same coordinate vectors as the foregoing in the configuration element and user dimensions. Examples of the resulting time coordinates are:

shift=1, hour=8, minute=1 shift=1, hour=8, minute=2 shift=1, hour=8, minute=3

Another operation on subcubes is roll-up, which is the inverse of drill-down. Roll-up takes a cube and dimension as arguments to produce a cube. To illustrate, consider a roll-up on a cube in the time dimension, with time coordinates shift=1, hour=8, minute=3. The new cube has the same non-time coordinates as the original one. The time coordinates are shift=1, hour=8.

Having data structured as an MDDB facilitates the scenario in the running example by providing navigations between levels in abstraction hierarchies. To illustrate, consider Step 1 in the scenario. Here, the analyst computes aggregate values for the abstraction instances within each abstraction hierarchy. This corresponds to doing a drill-down on each dimension, obtaining a value for each cube, and computing a summary statistic of the values.

While an MDDB facilitates problem isolation, it does not automate problem isolation. Indeed, today problem isolation is largely a manual task. Typically, problem isolation requires analysts to do a visual inspection of summary data. For example, in Step 2 of the scenario above, the analyst compares summaries done for different dimensions.

Existing art has severe deficiencies in the area of general-purpose automation of problem isolation, especially problem isolation based on data structured as an MDDB. Expert system diagnostic tools (e.g., B. Domanski, "A PROLOG-based Expert System for Tuning MVS/XA," Proceedings of the Computer Measurement Group, 160–166, 1987 and M. Arinze et al., "A Knowledge Based Decision Support System for Computer Performance Management," Decision Support Systems, Volume 8, 501–515, 1992) provide system-specific analyses of measurement data. While they sometimes provide root-cause analysis, these tools do not provide general-purpose automation of problem isolation in that they are difficult to adapt to the analysis of other systems and to changes in the system being analyzed. An alternative is to employ tools for navigating MDDB structured data (e.g., R. F. Berry and J. L. Hellerstein, "A Flexible and Scalable Approach to Navigating Measurement Data in Performance Management Applications," Second IEEE Conference on Systems Management, Toronto, Canada, June, 1996; C. Sriram, P. Martin, and W. Powley, "A Data Warehouse for Performance Management of Distributed Systems," Third IEEE Conference on Systems Management, Newport, Rhode Island, April, 1998; and the aforementioned SAS reference). However, these tools do not support automated navigation of performance data. Still another approach is to use MDDB navigations in acquiring knowledge of problem isolation (as the aforementioned Hellerstein reference does for data navigations in general). While this art automates the search for navigations done previously, it does not automate the selection of new navigations for problem isolation.

It is therefore an objective of the present invention to provide automated problem isolation in computer systems.

It is another objective of the invention to provide automated problem isolation in systems which have measurement data structured as a multidimensional database.

Yet another objective of the invention is to provide a method which uses external specifications of scoring functions, thereby allowing users to adapt the method to their needs.

Still another objective is to provide problem isolation which can automatically select new data navigation paths for problem isolation.

SUMMARY OF THE INVENTION

The foregoing and other objectives are realized by the present invention which comprises a system and method for automatically navigating in a multidimensional database for problem isolation, trending analysis, data mining, etc. In one embodiment of the invention, one or more problem isolation applications interact with end-users desiring automated navigation utilizing the following: an Automated Navigation Engine that uses externally specified selection functions to automate MDDB navigations; an MDDB Engine that provides MDDB navigation services to the Automated Navigation Engine; and a Data Access Engine that provides data access services to the MDDB Engine, along with optional features of an external specification of a dimension selection function and an external specification of a cube selection function. In such a system, automatic navigation is conducted by characterizing the information potential of the data for a plurality of dimensions, selecting the dimension having the greatest information potential based on said characterizing, identifying the cube within the selected dimension which exhibits the greatest information potential, and continuing until the navigation is complete, as determined by comparing the greatest identified information potential to a threshold.

BRIEF DESCRIPTION OF DRAWINGS

The invention will now be detailed with specific reference to the appended drawings wherein:

FIG. 2 contains the data used in the running example;

FIG. 4 shows how the data in FIG. 2 can be structured as an MDDB cube using the MDDB Schema in FIG. 3;

FIGS. 5A through 5C show the cubes obtained from drill-downs on the cube in FIG. 4;

FIGS. 6A through 6C depict the cubes obtained by a drill-down on the Configuration Element dimension of the cube (Subnet=9.2.15,,RT) in FIG. 5;

FIG. 8 displays key methods for classes in FIG. 7;

FIG. 10 contains key methods for classes in FIG. 9;

DETAILED DESCRIPTION OF THE INVENTION

Figure 1:
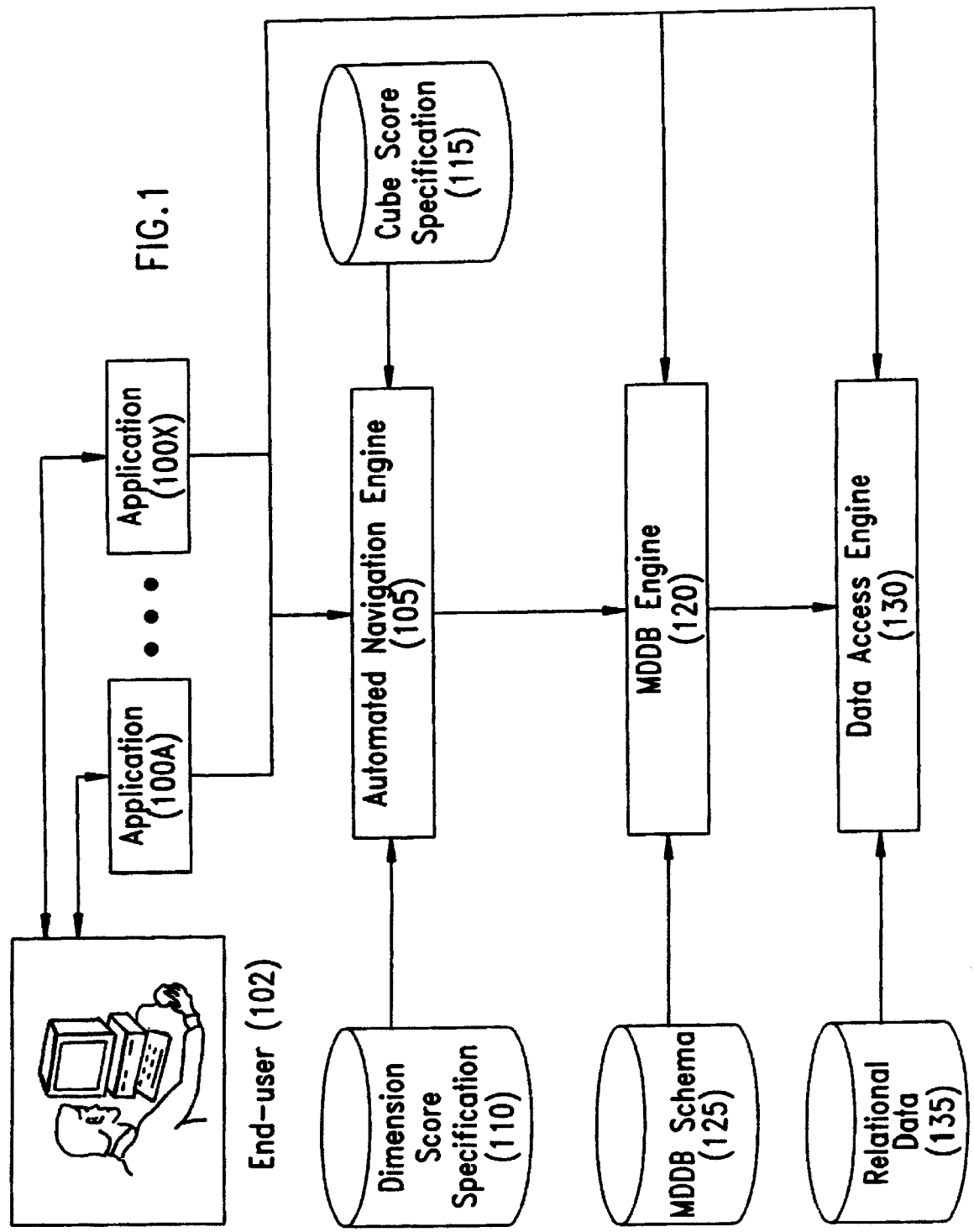
FIG. 1 displays shows the overall architecture of the system envisioned.

FIG. 1 displays the architecture of the inventive system. An end-user (102) interacts with diagnostic applications (100A through 100X) to do problem isolation. The diagnostic applications use services in the: (a) Automated Navigation Engine (105), which automates problem isolation, (b) the MDDB Engine (120), which provides MDDB operations such as drill-down and roll-up, and (c) the Data Access Engine (130), which provides access to measurement, topology, and other data. When the Automated Navigation Engine initializes, it takes as inputs a dimension score specification (110), which specifies the dimension score function to use, and a cube score specification (115), which specifies the cube score function to use. The specified dimension and cube score information could be altered by the application or the installation, as appropriate, without the need for altering the entire program. Dimensions that contain relatively static information (e.g., time) can be specified manually by a system designer having knowledge of the relevant measurement data. Also, information specific to a measurement source (e.g., the Metric dimension) would be provided manually by appropriate experts. More dynamic information such as configuration information, could be obtained automatically (e.g., by parsing the IP address to extract subnet information).

The Automated Navigation Engine uses the services of the MDDB Engine to navigate dimensionally structured data. The MDDB Engine has an MDDB Schema (125), which describes the multidimensional structure of the data. The MDDB Engine in turn uses the Data Access Engine (130) to store and retrieve data that are in the Relational Data component (135). To illustrate better the embodiment presented, an example is introduced which consists of the tabular data in FIG. 2. The column headings specify attributes in an relational database, including the category dimensions of time, system and user, along with the metric dimension of ResponseTime.

In the scenario described in the running example, as detailed above, basic steps are required for problem isolation using an abstraction hierarchy. Of those steps, an analyst's judgment is required in two of the steps, specifically Steps 2 and 3. In Step 2, the analyst selects an abstraction hierarchy (MDDB dimension) that best distinguishes between large and small values; and in Step 3, the analyst chooses the abstraction instance within the level of the selected hierarchy (the cube within the MDDB dimension) that best localizes the problem.

To automate the judgments made in Steps 2 and 3, appropriate criteria are required. For Step 2, the present invention uses a dimension score function that returns a numeric value indicating the relative merit of selecting a dimension. Without loss of generality, it is assumed for this description that dimension scores are positive and that larger values indicate greater problem isolation, though clearly an alternative scoring scheme could be implemented. The assignment of a dimension score function, corresponding to Step 2 of the running example, computes the range (difference between the maximum and minimum) of values of subcubes obtained in the drill-down on that dimension.

In general, the choice of dimension score function depends on the system being analyzed and the preferences of the analyst. The present invention provides for flexibility in the choice by using a dimension score specification which is an external input to the diagnostic system. Having the dimension score specification as an external input allows end-users and independent software vendors (ISVs) to indicate their preferred dimension score function. This mechanism can be implemented in many ways. For example, one could use a coded option in a file or a database field (e.g., a code of 5 means that the function is to compute the range of cube values).

To automate the judgments made in Step 3, a cube score function is used. As with the dimension score function, the described, preferred cube score function is a positive number, with larger values indicating that a cube better isolates the problem, although an alternative scoring scheme could be used. The cube score function assignment, corresponding to Step 3 of the running example, selects the cube with the largest value. As with the dimension scores, the present invention employs an external cube score specification that specifies the cube score function to be used.

Figure 3:
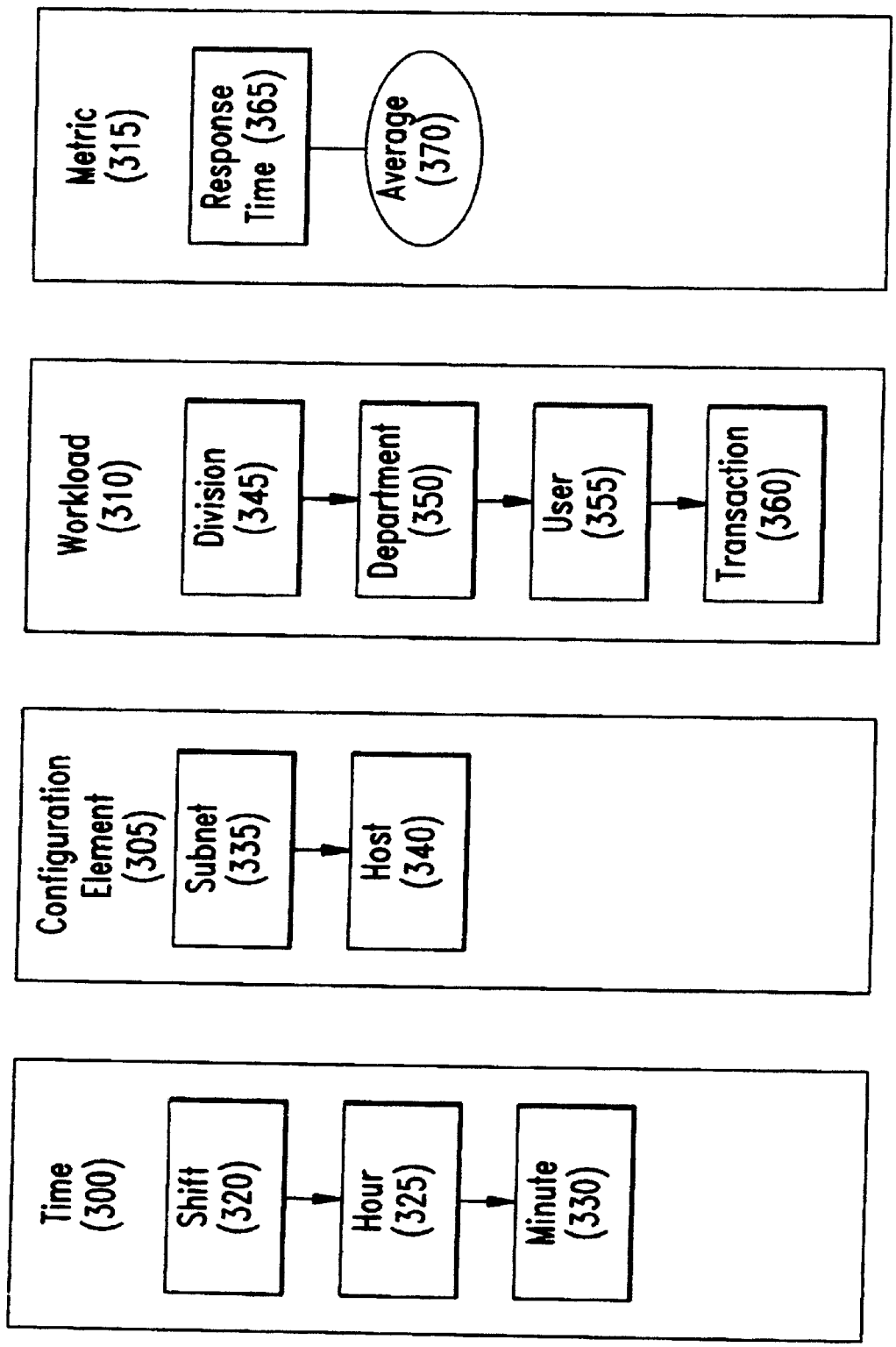
FIG. 3 displays an MDDB (multidimensional database) Schema used in the running example.

FIG. 3 displays an MDDB schema for the data of FIG. 2. The dimensions are: Time (300), Configuration Element (305), Workload (310), and Metric (315). The first three are category dimensions structured as a hierarchy of attributes in descending order for the data in FIG. 2. For Time, these attributes are in descending order from Shift (320) to Hour (325) to Minute (330). For Configuration Element, the hierarchy is Subnet (335) to Host (340). For Workload, it is Division (345), Department (350), User (355), and Transaction (360). Metric is the metric dimension, which consists of the single metric attribute Response Time (365). Response Time has an aggregation type, which is average (370).

FIG. 4 depicts a cube of the FIG. 2 data using the MDDB schema of FIG. 3. The boxes along the top are the dimensions in FIG. 3. The dark rectangle that encompasses the data indicates the span of the cube. In this case, all data in the table lie in a single cube. A cube is specified by an MDDB tuple. The set of such tuples are indicated by the column heading "MDDB Tuples" (400). The sole tuple is (,,,RT) (400). This is equivalent to a SQL select-statement for the column ResponseTime in which there is no whereclause that constrains which rows appear in the output of the select-statement.

The method used by the Automated Navigation Engine assumes that a problem isolation application, executing locally or at any location equipped with the appropriate communication interfaces, provides: (a) an initial cube and (b) a minimum value of the dimension score. The former is obtained from information acquired during problem detection. The latter is provided by the application to control the granularity of problem isolation. The method outputs a cube that isolates the problem to a subset of the data specified in the input cube. Broadly stated, the steps are:

Step 1: Average response times are computed for the highest level in each abstraction hierarchy, i.e., for each: (a) shift (for the time hierarchy), (b) subnet (for the configuration element hierarchy), and (c) division (for the user hierarchy).

Step 2: Determination is made as to which abstraction hierarchy best isolates the performance problem. In the running example, the determination would be to select the hierarchy with the largest range of response time values, specifically the configuration element hierarchy.

Step 3: Determination is made as to which instances in the abstraction hierarchy selected in Step 2 best localize the problem. In the running example, the instance with the largest value, 9.2.15, is selected.

Step 4: The abstraction instance chosen in Step 3 is applied to constrain the data used in subsequent steps. In the running example, this means that further navigations are restricted to data from subnet 9.2.15.

Step 5: The process moves one level lower in the configuration element hierarchy and the steps are repeated. So, in the next iteration of (b) in Step 1, host, instead of subnet, is used as the level in the configuration element hierarchy.

Steps 1–5 are repeated until either: (i) Step 2 does not provide much distinction between small and large response times or (ii) the lowest level in all abstraction hierarchies has been reached.

More pointedly, the iterative steps to be implemented are as follows:

(a) Set the current cube to the input cube;
(b) Select the dimension of the current cube that has the largest dimension score as computed by the dimension score function;
(c) If the score obtained in (b) is less than the minimum value specified on input, the method terminates;
(d) Otherwise, select the cube within the chosen dimension with the largest cube score as computed by cube score function; and
(e) Set the current cube to the cube chosen in (c). Steps (b)–(e) are repeated until Step (c) applies. Note that (b) corresponds to Steps 1 and 2 in the running example, and (d) corresponds to Step 3. Step 4 (constraining the data) and Step 5 (moving within the abstraction hierarchy) are addressed in (e) as a result of the semantics of MDDB drill-down. FIG. 5 illustrates the results of several drill-downs conducted on the data of the cube illustrated in FIG. 4. Table (500) shows the cubes resulting from a drill-down on the Time dimension. As before, cubes are designated by solid rectangles and their MDDB Tuples appear in the column to the right. The resulting tuples are (Shift=1,,,RT), (Shift=2,,,RT), and (Shift=3,,,RT). Similarly, (510) and (520) display drill-downs on the Configuration Element and Workload dimensions.

Figure 7:
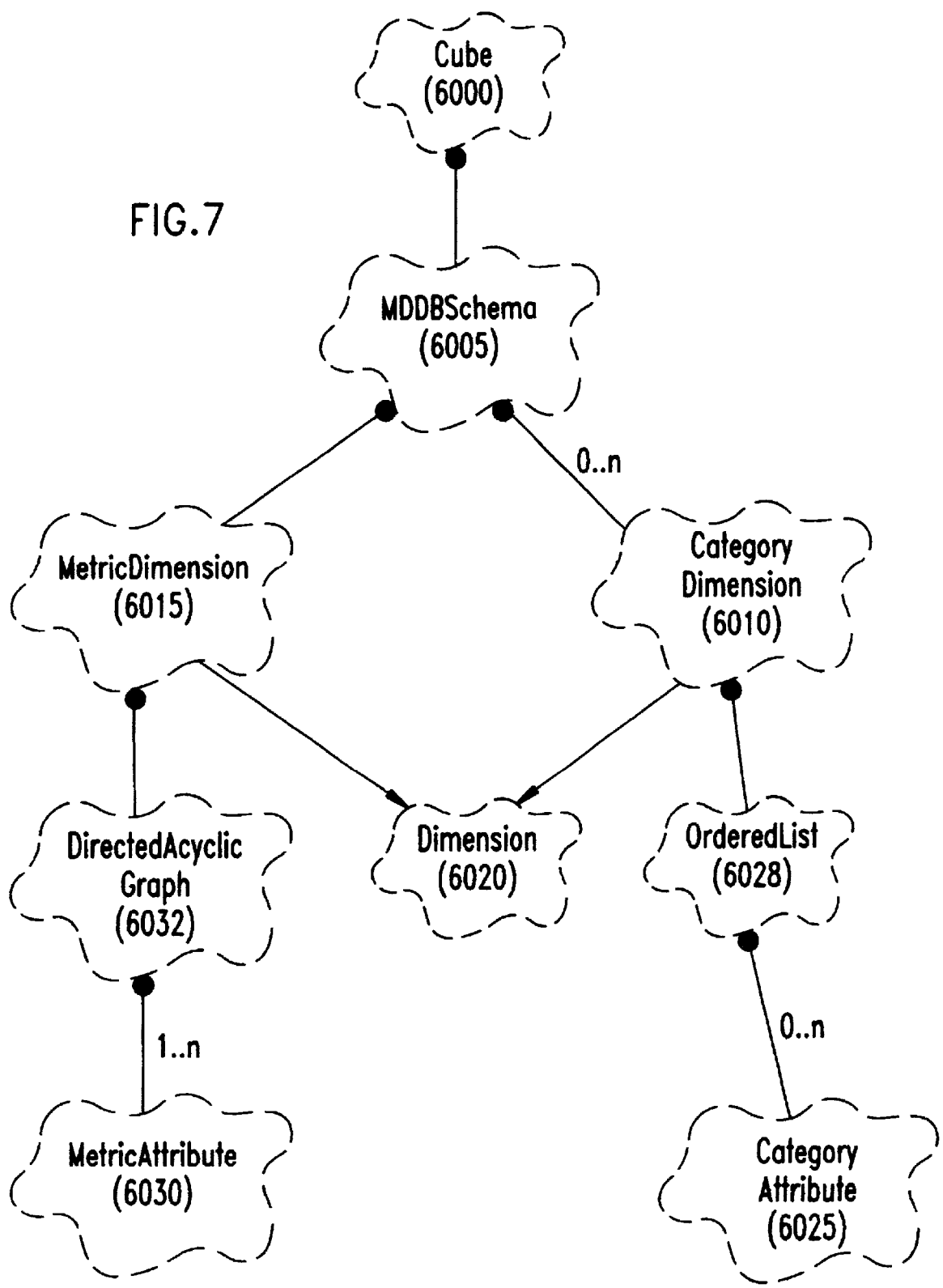
FIG. 7 displays the class diagrams used to describe the design of the MDDB Engine in (120) of FIG. 1.
Figure 9:
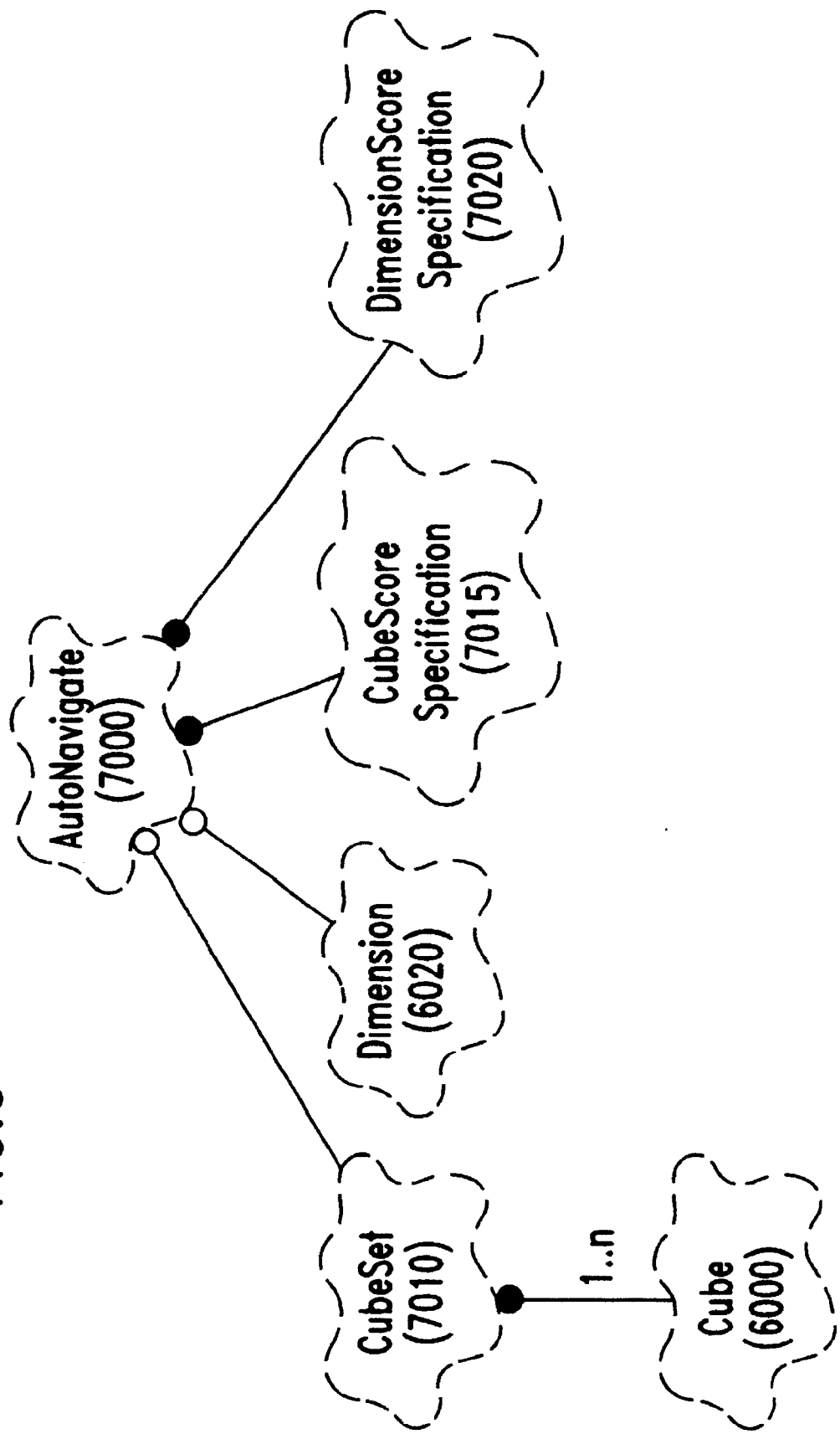
FIG. 9 contains a class diagram for the design of the AutoNavigate component in FIG. 1.

FIG. 6 depicts cubes produced by a drill-down on the cube (,Subnet=9.2.15,,RT). Note that the cubes shown in (600), (610), and (620) have Subnet=9.2.15 at the start of their Configuration Element coordinate vector. For pedagogical convenience, an object-oriented design methodology is used and described, though such is not required. FIG. 7 displays the class diagram for the services required of the MDDB Engine. A Cube (6000) provides services, such as drill-down and computation of the value of the cube. A Cube knows its MDDBSchema (6005), which has one MetricDimension (6015) and 0 or more CategoryDimension (6010). A MetricDimension has a DirectedAcyclicGraph (6032) of at least one MetricAttribute (6030). A CategoryDimension (6010) has an OrderedList (6028) of one or more CategoryAttributes (6025). Both MetricDimension and CategoryDimension inherit from the class Dimension (6020). FIG. 8 specifies the methods used by each class in FIG. 7. Implementation of these methods is straightforward to one skilled in the art FIG. 9 illustrates the class diagram for the key classes used in the AutomatedNavigationEngine (105) component in FIG. 1. The AutoNavigate class (7000) contains the logic for automated problem isolation. This class uses information obtained from CubeSet objects (7010), which are collections of Cubes (6000). AutoNavigate also uses information (6020) about Dimension objects to automate problem isolation. An AutoNavigate object has a CubeScoreSpecification (7015) that indicates how cube scores are computed, and a DimensionScoreSpecification (7020) that specifies how dimension scores are computed. These objects may be represented in many ways, such as a string of descriptive text or a complex object that computes score values. CubeScoreSpecification and DimensionScoreSpecification are private variables in that: (a) there is an instance of these variables for each AutoNavigate object; (b) the variables are used by several methods within an AutoNavigate object; and (c) the variables are not visible outside an AutoNavigate object.

FIG. 10 provides details of the objects employed by the inventive embodiment of the Automated Navigation Engine component. The CubeSet class is straightforward to implement. It is constructed from a set of cubes. Its value method returns a set of values that correspond to the value of each Cube in the CubeSet. Its getFirstCube and getNextCube methods provide a mechanism for iterating through the Cube objects in a CubeSet. Separate figures, discussed below, describe each of the methods of the AutoNavigate class.

Figure 11:
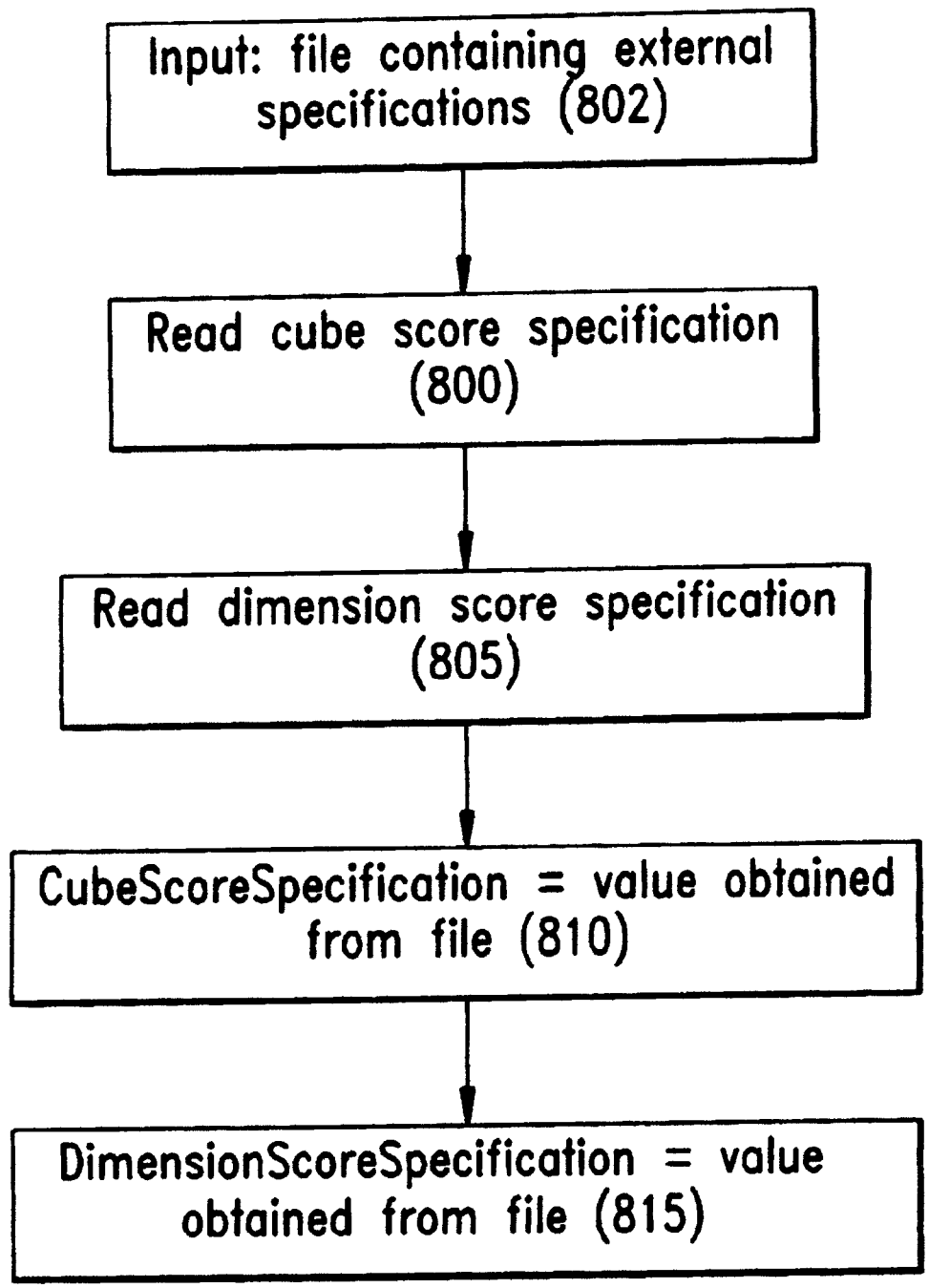
FIG. 11 displays the logic of the Constructor method of the AutoNavigate class.

FIG. 11 depicts the steps in the Constructor method of the AutoNavigate class. As shown in (802), the input to this method is a file containing the external specifications of the dimension score and cube score functions. In (800), the cube score specification is read, followed by the dimension score specification being read in (805). In (810), the CubeScoreSpecification variable within the AutoNavigate object is set to the value of the cube score specification read in (800). Similarly, (815) sets the DimensionScoreSpecification variable to the value of the dimension score specification read in (805).

Figure 12:
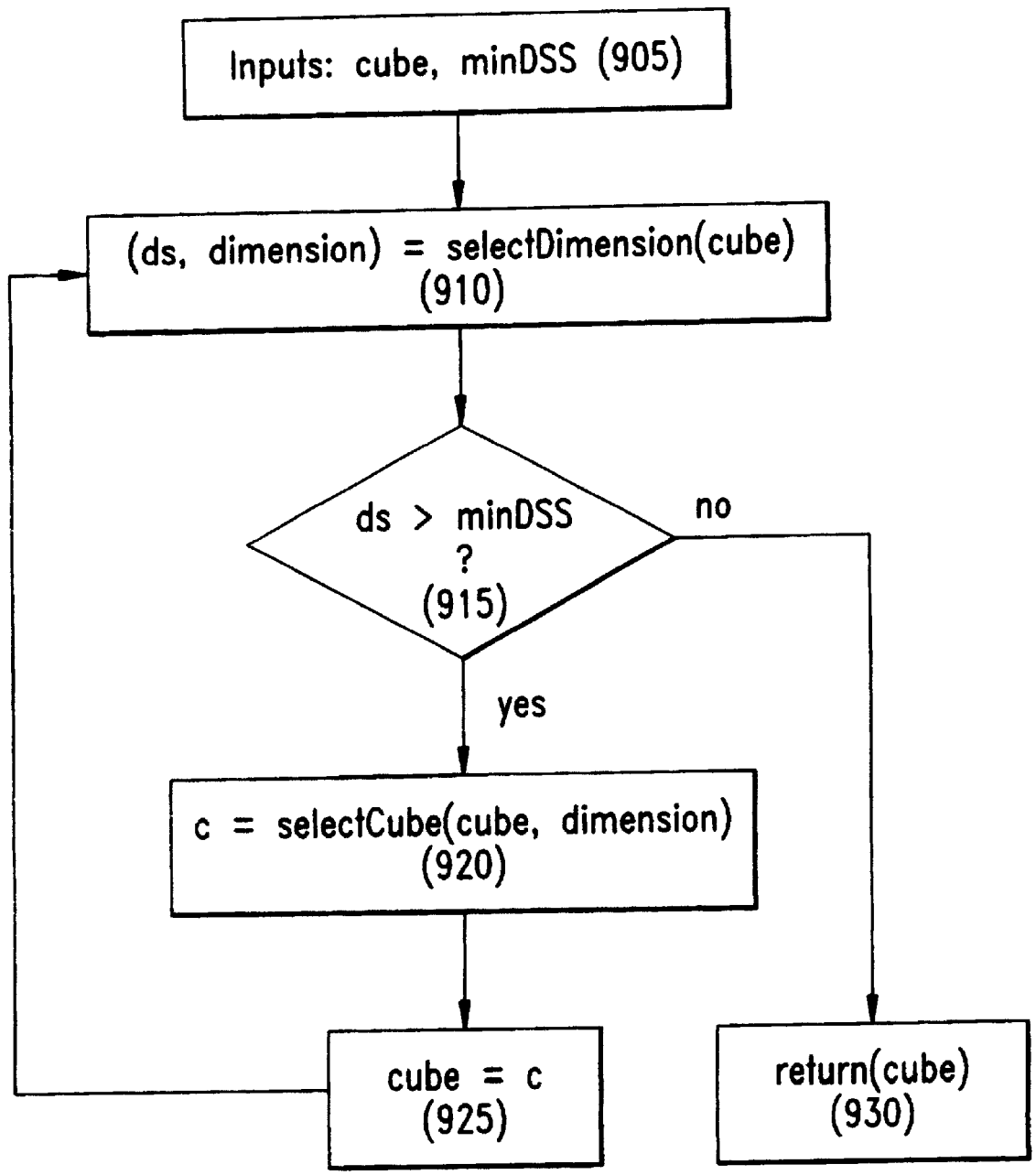
FIG. 12 displays the logic of the navigate method of the AutoNavigate class.

FIG. 12 contains the logic for the navigate method of the AutoNavigate class. Reference numeral (905) indicates the inputs to this method: a cube and a minimum value for the dimension score (denoted by minDS). In (910), the selectDimension method of AutoNavigate is invoked to choose the cube's dimensions that best isolate the problem. This method returns the score for the selected dimension (denoted by ds) and the dimension. In (915), a test is done to determine if the dimension score in (910) exceeds the minimum value specified on input to the method. If not, processing terminates in (930), and the current cube is returned. Otherwise, in (920) AutoNavigate's selectCube method is invoked (as further detailed with reference to FIG. 15) to find the best cube within the dimension selected in (910). In (925), this cube is made the current cube and control returns to (910).

Figure 13:
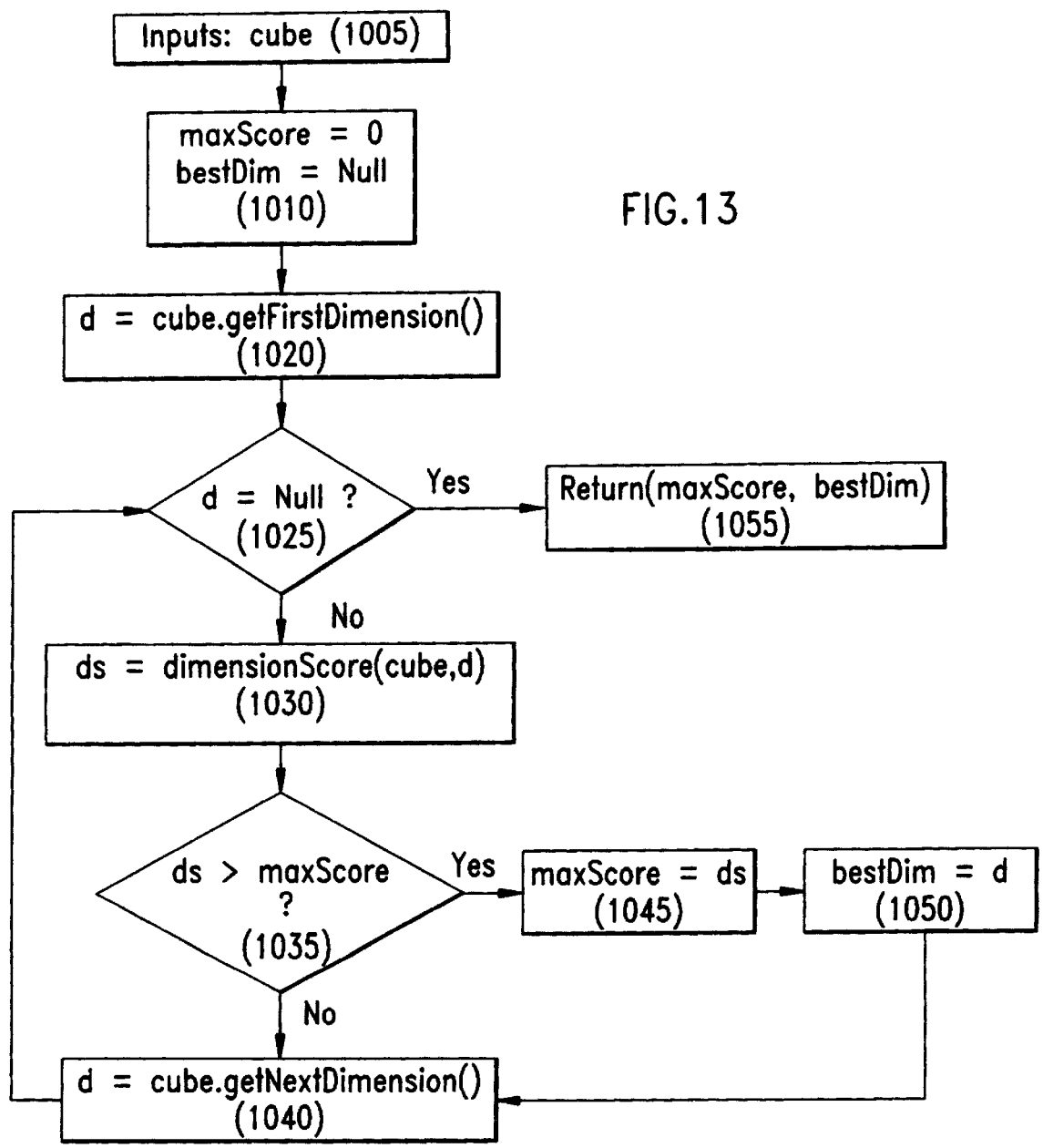
FIG. 13 displays the logic of the selectDimension method of the AutoNavigate class.
Figure 14:
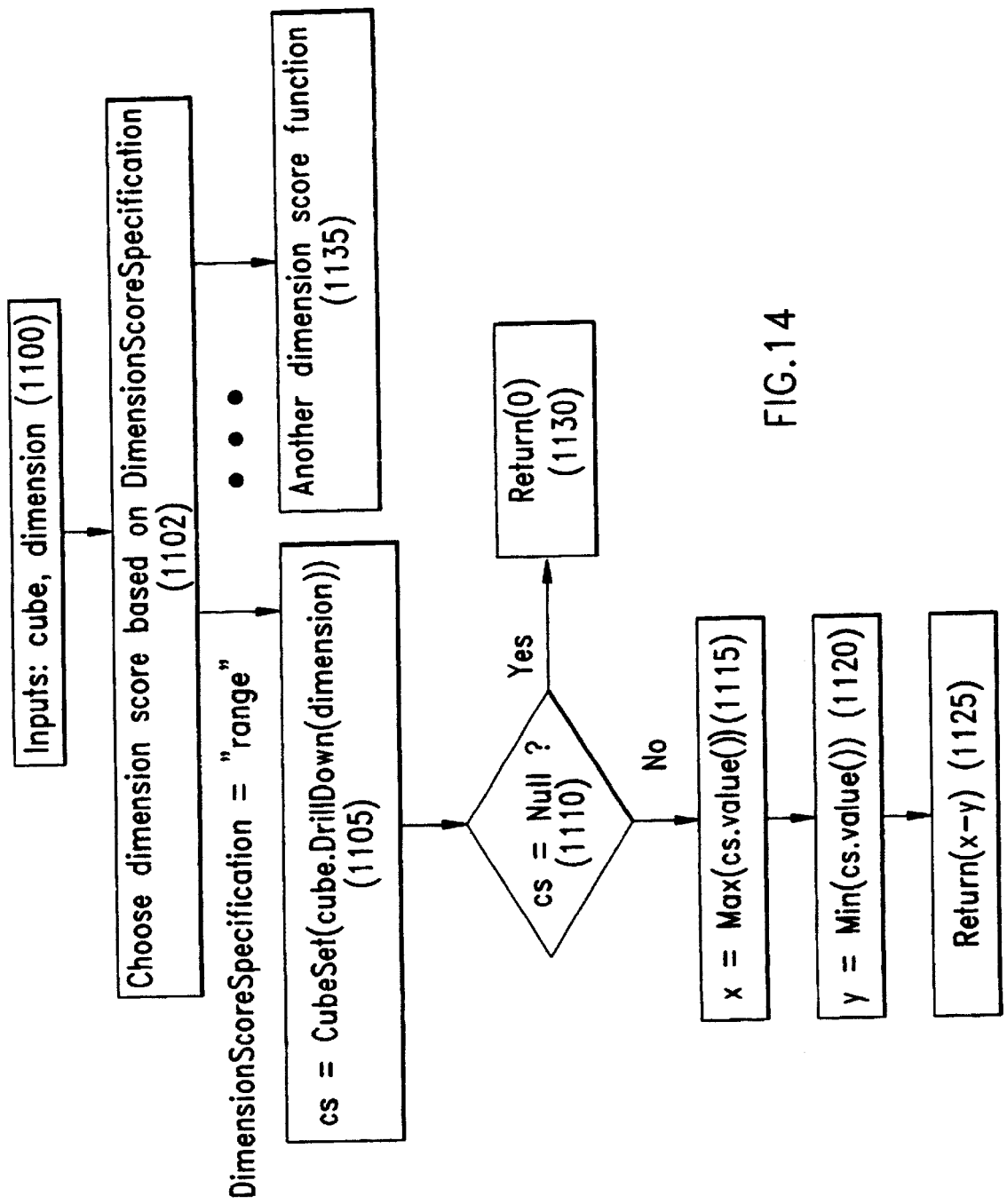
FIG. 14 displays the logic of the dimensionScore method of the AutoNavigate class.

FIG. 13 shows the selectDimension method of the AutoNavigate class, reference numeral 910 from FIG. 12. Step (1005) specifies that the input to this method is a cube. In (1010), the local variables maxScore and bestDim are initialized. In (1020), the first dimension in the cube is obtained and is assigned to the local variable d. At (1025), a test is made to see if the current dimension of the cube is Null (i.e., determine if the set is empty), which indicates that the iteration across all dimensions is completed. If it is, then processing in the method terminates in (1055), and the maximum dimension score (maxScore) and associated dimension (bestDim) are returned. If the iteration across all dimensions is not complete, AutoNavigate's dimensionScore method, (1030) further detailed in FIG. 14, is invoked to obtain the score for the current dimension (d). In (1035), the value of the score of this dimension is compared to the largest score so far observed (maxScore). If the score for d is larger, then in (1045) maxScore is set to ds (the score for d), and in (1050) bestDim is set to d. In either case, in (1040) d is set to the next dimension within the input cube and control returns to (1025).

FIG. 14 displays the logic of the dimensionScore method of the AutoNavigate class, from 1030 of FIG. 13. In step (1100) it is specified that the inputs to this method are a cube and a dimension within the cube. In (1102), logic is selected based on the value of the DimensionScoreSpecification variable within the AutoNavigate object (as set in (815) of FIG. 11). Two logic paths are shown in FIG. 14, specifically, (1135) indicating where code for a new dimension score function would be inserted, and (1105) which begins the logic for the "range" dimension score function. In (1105), the local variable cs is initialized to a CubeSet constructed from the set of cubes obtained from the drill-down on the input cube in the input dimension. In (1110), a test is conducted to determine if cs is Null, which would thereby indicate that no drill-down cube would be possible. Such an instance, wherein cs is Null, may happen, for example, if the coordinate vector of the input dimension in the input cube contains all attributes in the attribute hierarchy of dimension. To illustrate, consider the running example introduced in FIG. 2 with the MDDB Schema in FIG. 3 and a drill-down on the Time Dimension of a cube with the Time coordinate vector Shift=1, Hour=8, Minute=10. Since Minute is the lowest attribute in the Time Hierarchy (300) of FIG. 3, no drill-down is possible. If the answer in (1110) is yes (i.e., cs is Null, or empty,), then the input dimension provides little insight into problem isolation; hence, (1130) returns a dimension score of 0. Otherwise, (1115) computes the maximum value of the cubes in cs, (1120) computes the minimum value, and (1125) returns the difference between these values as the score of the input dimension.

Figure 15:
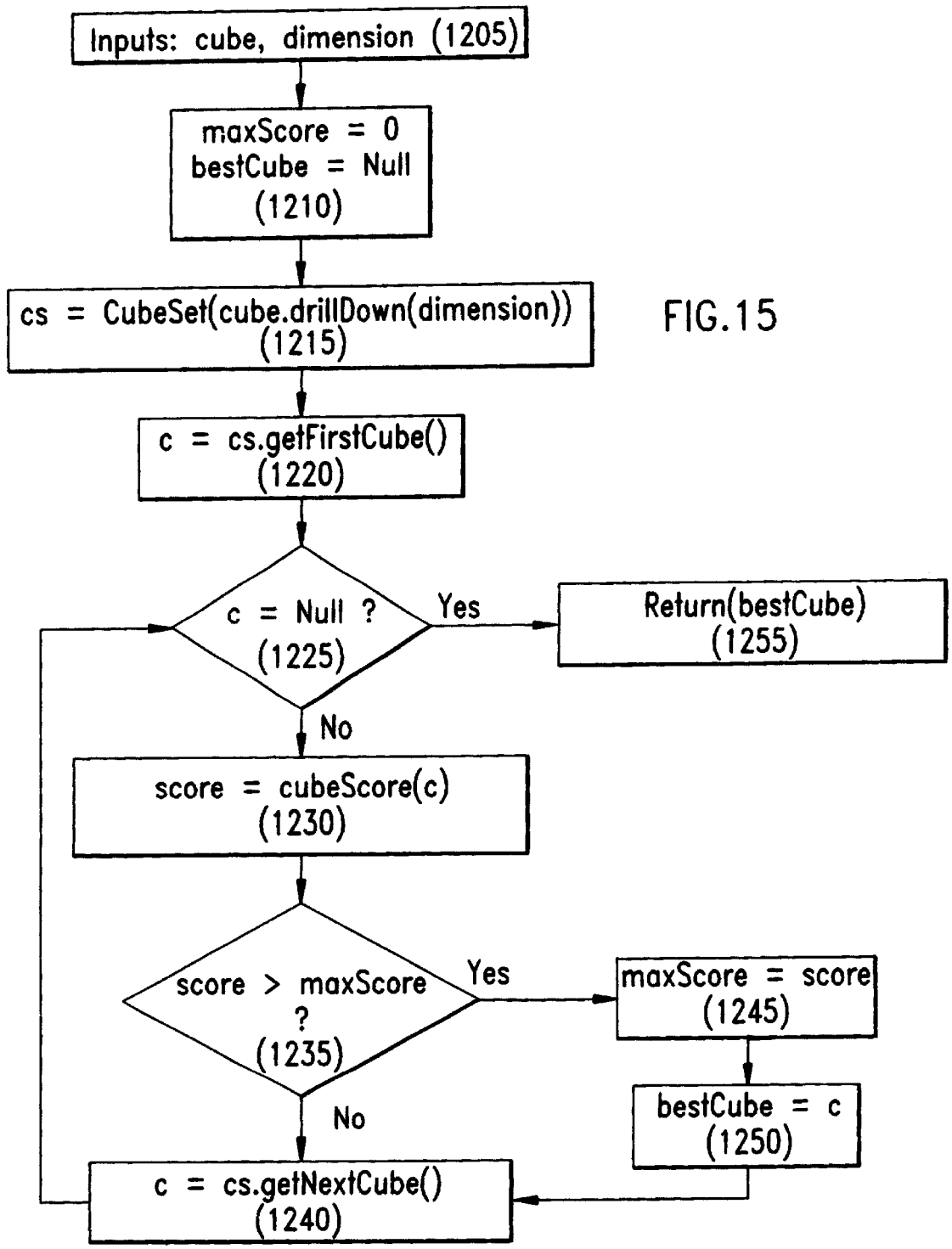
FIG. 15 displays the logic of the selectCube method of the AutoNavigate class.

FIG. 15 describes the selectCube method of the AutoNavigate class, from reference numeral 920 in FIG. 12. Step (1205) indicates that the inputs to this method are a cube and a dimension within the cube. In (1210), the local variables maxScore and bestCube are initialized; bestCube will contain the cube with the highest score; maxScore is this score. In (1215), the local variable cs is initialized to a CubeSet corresponding to the collection of cubes obtained from the drill-down on the input cube for the input dimension. At (1220), the first cube in the CubeSet cs is assigned to the local variable c. In (1225), a test is made to see if the current cube of cs is Null, which indicates that the iteration across cubes is completed. If it is, then processing in the method terminates in (1255), and the cube with the highest score (bestCube) is returned. If not, in (1230) AutoNavigate's cubeScore method is invoked (as detailed in FIG. 16) to obtain the score for c, the current cube. In (1235), the value of the score of cube c is compared to the largest score so far observed (maxScore). If the score for c is larger than the current best cube, then in (1245) maxScore is set to score (the score for c), and in (1250) bestCube is set to c. In either case, in (1240) c is set to the next cube within the cs, and control returns to (1225).

Figure 16:
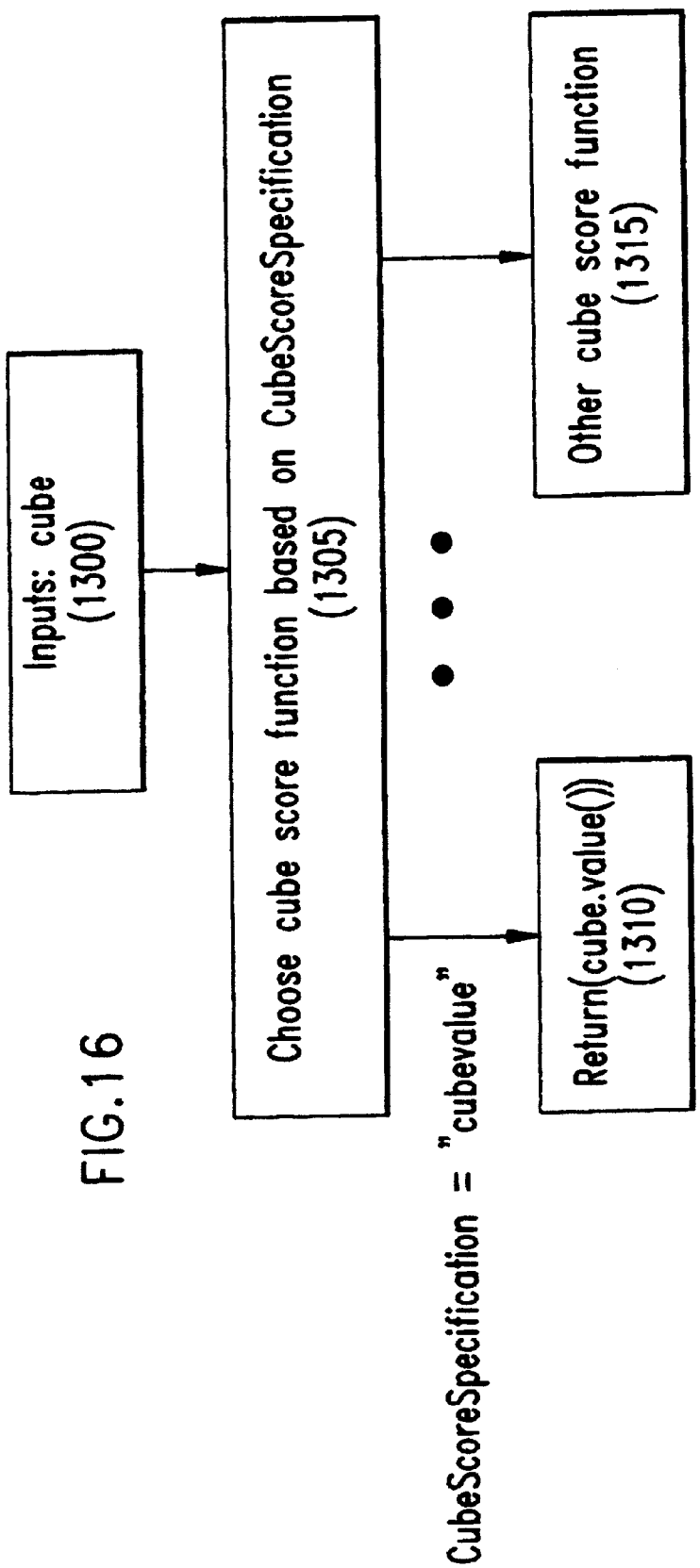
FIG. 16 displays the logic of the cubeScore method of the AutoNavigate class.

FIG. 16 depicts the cubeScore method of the AutoNavigate class from step 1230 of FIG. 15. Step (1300) indicates that the input to this method is a cube. In (1305), logic is selected based on the value of the CubeScoreSpecification variable within the AutoNavigate object (as set in (810) of FIG. 11). Two logic paths are shown in the FIG. 16; specifically (1315) indicating where code for a new cube score function would be inserted; and (1310) which contains the logic for the "cubevalue" cube score function. This logic returns the cube's value as its score.

To illustrate the operation of AutoNavigate, it is applied to the data in FIG. 2 with the MDDB Schema in FIG. 3. It is assumed that AutoNavigate has been constructed with a file that contains "range" for the dimension score specification and "cubevalue" for the cube score specification. Thus, the Constructor method of AutoNavigate will, by the logic in FIG. 11, assign "cubevalue" to CubeScoreSpecification and "range" to DimensionScoreSpecification.

Now consider a management application (100) in FIG. 1 that invokes the navigate method of the AutoNavigate object constructed above, wherein the inputs are: the cube (,,,RT) from FIG. 4 (which uses the MDDB Schema of FIG. 3) and the value 10, which is the minimum dimension score. The operation of the navigate method in the running example is summarized in FIG. 17, which displays the cubes traversed along with the dimension and cube scores considered (with only the non-metric dimensions considered for this example). Step (910) of FIG. 12 invokes the selectDimension method for (,,,RT) for each dimension in the MDDB Schema. For example, in the selectDimension method (FIG. 13), (1030) invokes the dimensionScore method, which in turn invokes the "range" logic in FIG. 14. In the case of the Time dimension, this causes a drill-down on Time for the cube (,,,RT), which produces the dimension score in (1410) of FIG. 17. In subsequent loops of (1025) of selectDimension, the same computations are done for the Configuration Element and Workload dimensions. The results are shown in (1420) and (1430) of FIG. 17. Since Configuration Element has the largest dimension score, selectDimesion returns with maxScore=12.47 and bestDim= Configuration Element (1055).

Figure 17:
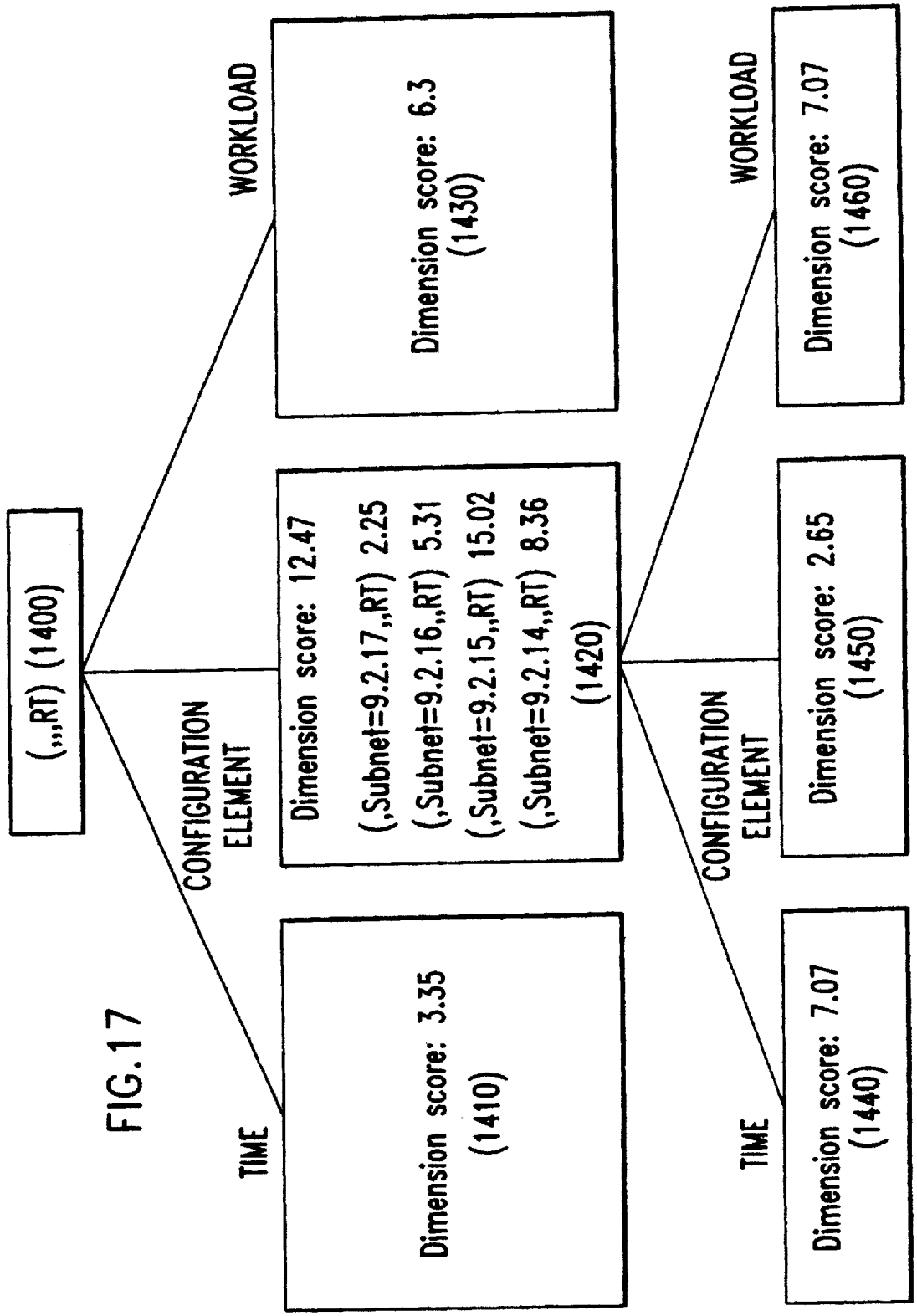
FIG. 17 illustrates the cubes navigated by applying the navigate method to data in the running example.

Next, (915) determines that the dimension score of 12.47 exceeds the minimum value specified of 10. So, selectCube is invoked in (920), which computes the subcubes of (,,,RT) in the Configuration Element dimension. Box (1230) of FIG. 15 (selectCube) is invoked for each cube in the drill-own of (,,,RT) in the Configuration Element Dimension. These cubes are: (,Subnet=9.2.17,,RT), (,Subnet=9.2.16,,RT), (,Subnet=9.2.15,,RT), and (,Subnet=9.2.14,,RT). The cube scores are shown in FIG. 17, box (1420). The FIG. 15 sub-process chooses the cube with the largest score, which is (,Subnet=9.2.15,,RT).

Control returns to (920) of FIG. 12, where c is assigned the value of (,Subnet=9.2.15,,RT). Then selectDimension is invoked for this cube. The results are shown in FIG. 17 boxes (1440), (1450), and (1460). Note that none exceeds 10. Hence, (915) of FIG. 12 will flow to (930), and navigate returns the cube (,Subnet=9.2.15,,RT).

The method is novel in that: (a) there is no existing art for automated navigation using MDDB operations; (b) the method describes the operation of a novel component, the Automated Navigation Engine; and (c) the method uses external specifications of scoring functions, rather than scoring functions that are embedded within other program logic and which could not then be adapted by end-users or ISVs to particular problem-solving situations).

The present invention advances the state-of-the-art in several ways. First, it reduces the skill level required for problem isolation by incorporating into computer programs some of the decisions made by experts in problem analysis. Since the high cost of systems management are, in part, due to the scarcity of skilled analysts, the invention offers hope for reducing these costs.

A second way in which the present invention advances the state-of-the-art is by increasing the productivity of expert analysts by automating some of the routine tasks they do currently. This is done in a way whereby experts retain control of the manner in which the analysis proceeds. In particular, the present invention provides experts with the opportunity to change the logic used to choose dimensions to navigate and the cubes to select once a dimension is chosen. Such flexibility is essential to permit analysts the flexibility required in addressing novel problems.

Further, the present invention, in combination with a properly constructed problem isolation application, provides end users with control over the granularity of problem isolation. In particular, analysts can control the conditions under which abstraction hierarchies are navigated by adjusting the minimum dimension score. If a larger dimension score is specified, then a dimension must offer greater problem isolation if it is to be considered for navigation.

Several extensions are possible to the system and method of the invention. First, while the foregoing description provides for problem isolation proceeding along one dimension at a time, the method can be extended to exploring multiple dimensions simultaneously, although care must be taken to avoid an exponential explosion in the search space. Second, backtracking capability can be added, which requires: (a) using roll-up as well as drill-down; and (b) having a criteria for when backtracking should be employed to expand the effectiveness of the problem isolation. Third, while an architecture in which the MDDB Engine is layered on a relational database is employed by way of example, such a structure is not essential to the operation of the Automated Navigation Engine. Rather, the Automated Navigation Engine only requires MDDB services, irrespective of how the MDDB Engine is constructed and implemented.

Fourth, although the present invention permits the external specification of dimension and cube score functions, there is no requirement that these functions be specified externally. They can also be embedded within the logic of the Automated Navigation Engine. Fifth, the system and method of the present invention may be embedded within other systems that provide broader functions, such as complete diagnostics and problem resolution. Last, the method presented, which considers the selection of a single cube within a dimension can be extended to choose multiple subcubes, although doing so requires keeping track of multiple navigation paths.

Having thus described our invention, what we desire to secure by Letters Patent is:

1. A system for obtaining information by automatically navigating measurement data that is structured into cubes comprising a plurality of dimensions, the system being associated with a multidimensional database component for specifying said cubes, said system comprising:
   (a) a dimension selection component that quantifies information provided by navigating to a dimension;
   (b) a cube selection component that quantifies the extent to which a cube provides information; and
   (c) an automated navigation engine that uses the multidimensional database component, the dimension selection component and the cube selection component to automate navigations by iteratively selecting the best cube within successively selected cube dimensions to arrive at the cube having the desired information.

2. The system of claim 1 wherein said system is adapted to run at least one problem isolation application and wherein said navigations isolate problems.

3. The system of claim 1 wherein said navigations comprise mining of data stored in said database.

4. The system of claim 1 wherein said navigations comprise trending analysis.

5. A method for a system to automatically navigate measurement data for information gathering, wherein said measurement data is structured into a plurality of cubes comprising a plurality of dimensions, said method comprising the steps of:
   (a) characterizing the information potential of said data for each of said plurality of dimensions;
   (b) selecting the dimension having the greatest information potential based upon said characterizing;
   (c) comparing the dimension information potential of said selected dimension to a preset threshold;
   (d) terminating the method if the dimension information potential for said selected dimension is less than said threshold;
   (e) determining the cube information potential for at least one of said plurality of cubes within said selected dimension when said dimension information potential is not less than said threshold;
   (f) selecting the cube within the selected dimension with the largest cube information potential, and
   (g) iteratively selecting the best cube within successively selected cube dimensions by repeating steps (b) through (f) to arrive at the cube having the desired information.

6. The method of claim 5 wherein said characterizing comprises quantifying the information potential.

7. The method of claim 6 wherein said system has at least one associated dimension selection component for operating with a dimension selection function, and wherein said quantifying comprises computing a dimension selection score by said dimension selection function for each of said plurality of dimensions.

8. The method of claim 6 wherein said system has at least one associated cube selection component for operating with a cube selection function, and wherein said selecting said cube comprises computing a cube selection score by said cube selection function.

9. The method of claim 7 wherein said system further comprises at least one associated cube selection component for operating with a cube selection function, and wherein said selecting said cube comprises computing a cube selection score by said cube selection function.

10. The method of claim 9 wherein at least one of said cube selection function and said dimension selection function are externally specified.

11. The method of claim 8 wherein said cube selection function is externally specified.

12. The method of claim 7 wherein said dimension selection function is externally specified.

13. A method for providing automated problem isolation for a computer system adapted for detecting a problem, for gathering relevant problem data, and for providing said data in a cube, comprising the steps of:

(a) obtaining an initial cube of relevant data from said computer system;

(b) selecting a cube dimension that best isolates the problem;

(c) comparing said selected cube dimension to a threshold;

(d) finding the best cube in said selected cube dimension when said selected cube dimension is not less than said threshold;

(e) repeating steps (b) through (d) until said selected cube dimension is less than said threshold.

14. The method of claim 13 further comprising the step of obtaining a dimension score function to control the granularity of said problem isolation.

15. The method of claim 13 wherein said finding the best cube in said selected cube dimension comprises the steps of:

(a) selecting a present dimension score;

(b) identifying a successive dimension in said cube;

(c) computing a successive dimension score for said successive dimension;

(d) comparing said successive dimension score to said present dimension score;

(e) replacing said present dimension score with said successive score when said successive score better isolates the problem;

(f) determining whether all dimensions have been analyzed; and (g) repeating steps (b) through (f) until all dimensions have been analyzed.

16. The method of claim 15 further comprising applying at least one of a cube score function and a dimension score function for computing scores.

17. The method of claim 16 wherein at least one of said cube score function and said dimension score function is externally specified.

18. A program storage device readable by machine, tangibly embodying a program of instructions executable by the machine to perform method steps for a system associated with said machine to navigate measurement data for information gathering, wherein said measurement data is structured into a plurality of cubes comprising a plurality of dimensions, said method steps comprising:

(a) characterizing the information potential of said data for each of said plurality of dimensions;

(b) selecting the dimension having the greatest information potential based upon said characterizing;

(c) comparing the dimension information potential of said selected dimension to a preset threshold;

(d) terminating the method if the dimension information potential for said selected dimension is less than said threshold;

(e) determining the cube information potential for at least one of said plurality of cubes within said selected dimension when said dimension information potential is not less than said threshold;

(f) selecting the cube within the selected dimension with the largest cube information potential, and (g) iteratively selectinq the best cube within successively selected cube dimensions by repeating steps (b) through (f) to arrive at the cube having the desired information.

19. The device of claim 18 wherein said characterizing comprises quantifying the information potential.

20. The device of claim 19 wherein said system has at least one associated dimension selection component for operating with a dimension selection function, and wherein said quantifying comprises computing a dimension selection score by said dimension selection function for each of said plurality of dimensions.

21. The device of claim 19 wherein said system has at least one associated cube selection component for operating with a cube selection function, and wherein said selecting said cube comprises computing a cube selection score by said cube selection function.

22. The device of claim 20 wherein said system further comprises at least one associated cube selection component for operating with a cube selection function, and wherein said selecting said cube comprises computing a cube selection score by said cube selection function.

23. The device of claim 22 wherein at least one of said cube selection function and said dimension selection function are externally specified.

24. The device of claim 21 wherein said cube selection function is externally specified.

25. The device of claim 20 wherein said dimension selection function is externally specified.

* * * * *